United States Patent [19]

Bacon et al.

[11] Patent Number: 4,534,863

[45] Date of Patent: Aug. 13, 1985

[54] CENTRIFUGAL FILTERING DEVICE AND FILTER UNIT THEREFOR

[75] Inventors: David L. Bacon; Richard D. Kremer; Randall H. Morse, all of Keene, N.H.

[73] Assignee: Schleicher & Schuell, Inc., Keene, N.H.

[21] Appl. No.: 612,905

[22] Filed: May 22, 1984

[51] Int. Cl.³ .............................................. B01D 25/02
[52] U.S. Cl. ..................................... 210/232; 210/927
[58] Field of Search ............................... 210/232, 927

[56] References Cited

U.S. PATENT DOCUMENTS

| | | | |
|---|---|---|---|
| 3,002,870 | 10/1961 | Belgarde et al. | 210/232 |
| 3,358,839 | 12/1967 | Simons | 210/232 |
| 3,360,128 | 12/1967 | Federline | 210/232 |
| 3,733,179 | 5/1973 | Guehler | 210/927 |
| 3,782,083 | 1/1974 | Rosenberg | 210/927 |
| 3,800,947 | 4/1974 | Smith | 210/927 |
| 3,870,639 | 3/1975 | Moore et al. | 210/927 |

FOREIGN PATENT DOCUMENTS

| | | | |
|---|---|---|---|
| 2415618 | 10/1975 | Fed. Rep. of Germany | 210/927 |
| 762906 | 12/1956 | United Kingdom | 210/232 |

Primary Examiner—Tim Miles
Attorney, Agent, or Firm—Cooper, Dunham, Clark, Griffin & Moran

[57] ABSTRACT

A centrifugal filtering device including a filter unit comprising an open-ended sample tube; a filter support element, with a central open-ended passage, ultrasonically welded to the outlet end of the sample tube at an annular joint and having a seat at its outer end; and a filter clamped between the sample tube and the support element, through which liquid is forced from the sample tube when the device is centrifuged. The complete device also includes a receiving vessel, for collecting filtered liquid, removably mounted on the support element seat, and a cap for the inlet end of the sample tube. The annular weld joint is made relatively weak to enable separation of the support element and sample tube for recovery of the filter. The sample tube, support element and receiver vessel are made of polypropylene. To maximize fluid recovery, the inner wall of the sample tube tapers inwardly to the outlet opening of the tube, and the support element seat is arranged to mount either of two different sizes of receiver vessels.

24 Claims, 8 Drawing Figures

CENTRIFUGAL FILTERING DEVICE AND FILTER UNIT THEREFOR

BACKGROUND OF THE INVENTION

This invention relates to devices for centrifugal filtering of fluid samples, and to filter units for such devices.

The analysis of relatively small fluid samples for industrial, medical and other purposes commonly requires, as a preliminary step, separation of solid and liquid components of a sample by microfiltration. It is known to perform such filtration by a procedure herein termed centrifugal filtering, viz. by placing the sample in one end of a tubular device which is divided transversely by a microfilter and spinning the device in a centrifuge so as to force the liquid of the sample through the filter into the other end of the device, for subsequent removal and analysis, solid components of the sample being retained on the filter. Centrifugal filtering affords advantages, notably including rapidity of filtering action and ability to prepare multiple samples simultaneously, over other types of filtering methods.

There is an increasing demand in the area of analytical chemistry for filtration devices capable of handling moderate (e.g. 5 ml) to small (e.g. 20 μl) samples of great value, in a manner which is rapid, gives high recovery, and minimizes any possibility of sample contamination. Among other specific desired attributes of a centrifugal filtering device are capability of enabling facile recovery of solid components separated from the liquid of a sample by the filtering operation (so that the solids, as well as the liquids, can be analyzed); low cost and ease of manufacture; simplicity of handling by the user; and suitability for use in conventional centrifuges. Moreover, along with increasing instrument sensitivity, speed of processing throughput, and dedicated component detection and quantitation, has come an increasing need for prior sample preparation techniques providing means for rapid sampling, desalting, and buffer exchange, or prepurification (selective removal of specific components or groups of components to eliminate possible interference in the analytical detection of the remaining components or to retain such components for eventual recovery in concentrated form), to obtain a sample in the most suitable form for instrumental analysis. Desirably, centrifugal filtering devices should not only be designed to carry out the functions of general filtration (separation and isolation of solid and liquid components one from another) but should also be sufficiently versatile for use in these more demanding and sophisticated types of sample preparation required by present-day high resolution instrumentation.

SUMMARY OF THE INVENTION

The present invention contemplates the provision of improvements in a centrifugal filtering device of the type broadly comprising a generally cylindrical sample tube having an open inlet end and an open outlet end; a filter support element ultrasonically welded to the outlet end of the sample tube at an annular joint and defining an open-ended passage coaxial with the sample tube, the support element having a forward end formed with an annular seat surrounding the passage; a filter clamped between the outlet end of the sample tube and the support element for completely occluding the passage such that liquid can enter the passage from the sample tube only by passing through the filter; a receiver vessel having an open inlet end removably mounted on the seat, and a closed outer end, for collecting and retaining liquid advancing forwardly through the passage from the filter; and a cap for closing the inlet end of the sample tube. In the use of this device, a sample to be filtered is placed in the sample tube, which is then capped, and the device is spun in a centrifuge to cause the liquid of the sample to pass forwardly through the filter into the receiver vessel. Thereafter, the latter vessel is removed from the device (and capped, if desired, for handling or storage) to enable recovery and analysis of the filtered liquid. It will be understood that the terms "forwardly" and "rearwardly" as used herein refer respectively to the direction in which the liquid advances through the device during centrifuging, and to the opposite direction.

As a first particular feature of the invention, in a device of the described type, the annular weld joint is made sufficiently mechanically weaker than the sample tube and the filter support element to enable the sample tube and the support element to be separated by application of manual bending forces at the joint for recovering the filter, i.e. to obtain (for analysis) the separated solids collected on the filter. To this end, the filter support element and the sample tube may cooperatively define an annular incised score line laterally surrounding the weld joint. Also, advantageously, the outlet end of the sample tube has a central circular opening for egress of fluid from the sample tube, a first forwardly-facing annular land surrounding the circular opening, an annular stop ridge surrounding the first land, and a second forwardly-facing annular land surrounding the stop ridge, which projects forwardly of the first and second lands. The filter is circular, with a diameter intermediate the diameter of the aforementioned circular opening and the inner diameter of the stop ridge, and is disposed in occluding relation to the circular opening with its periphery engaging the first land and completely laterally surrounded by the stop ridge; and the filter support element has a rearward end formed with a rearwardly projecting annular lip surrounding the support element passage and dimensioned to be received within the annular stop ridge for engaging the peripheral portion of the filter, disposed as aforesaid, to press the filter periphery against the first land. The annular weld joint is formed between the filter support element and the second land in generally concentric, outwardly spaced relation to the stop ridge, which thus prevents fused material of the weld joint from reaching and adhering to the filter and consequently assures ready and complete removal of the filter when the device is separated at the joint.

Further in accordance with the invention, in specific aspects thereof, and again particularly to facilitate manual separation of the device at the weld joint while affording a complete seal prior to separation, the filter support element has, at its rearward end, an annular energy-directing ridge of rearwardly tapering V-shaped profile in outwardly spaced surrounding relation to the lip such that, with the lip received within the annular stop ridge, the apex of the energy-directing ridge bears against the second land at a locality spaced outwardly of the stop ridge. The energy-directing ridge is shaped to concentrate ultrasonic energy at its apex for localized fusion and welding of its apex to the second land upon application of ultrasonic energy to the support element.

The provision of a preassembled filter unit (sample tube, filter, and filter support element) with a secure and complete seal at the ultrasonically welded joint is highly beneficial from the standpoint of ease of handling by the user, and protection against contamination. The facile removal of an intact filter, afforded by the separability of the joint, is important for reliable quantitative analysis of collected solids, and offers the additional advantage of preventing reuse of the unit, since re-use tends to cause contamination by minute quantities of previous samples accumulating in scratches or other surface irregularities almost unavoidably produced by use and cleaning; and with analysis for detection of substances present in a few parts per million or parts per billion, even microcontamination may be highly deleterious. Also, if radioactive material is used, it is important that the filtering device be disposable and not reusable.

In a somewhat broader sense, the invention contemplates the provision of a device of the described type wherein the sample tube has an open outlet end with a central circular opening for egress of fluid from the sample tube and a forwardly-facing annular surface surrounding the central opening; wherein the filter support element has a rearward end with a rearwardly-facing annular surface surrounding the support element passage and dimensioned and positioned for register with the forwardly-facing annular surface of the sample tube; and wherein the filter is circular, with a periphery engaged by and compressed between the forwardly-facing annular surface of the sample tube and the rearwardly-facing annular surface of the support element for completely occluding the support element passage so that liquid can enter the passage from the sample tube only by passing through the filter, the annular joint essentially concentrically surrounding the filter periphery in outwardly spaced relation thereto. This construction is advantageously simple, effective, and convenient and economical from a manufacturing standpoint, especially in affording sound, fluid-tight mounting of the filter without resort to auxiliary sealing elements such as gaskets or O-rings.

As a further particular feature of the invention, the sample tube and support element (and also, very preferably, the receiver vessel) are made of polypropylene. An advantage of this feature is that polypropylene is highly resistant to most solvents, and therefore less vulnerable to attack by fluid samples than other materials (e.g. polystyrene) heretofore used for centrifugal filtering devices.

As yet another particular feature of the invention, the sample tube has a generally cylindrical inner wall defining a chamber for receiving a fluid sample, and a circular outlet opening for the chamber at the outlet end of the tube, and the forward portion of the inner wall tapers inwardly to the periphery of the outlet opening. This wall configuration minimizes "hold up" of fluid in the sample tube during centrifuging, with resultant improved recovery of filtered liquid even from very small samples.

A further feature of the invention contributing to maximization of recovery of filtered liquid is the provision of a receiver vessel seat (on the support element) formed with two portions of respectively different diameters, disposed in succession along the axis of the support element passage, for respectively mounting receiver vessels of different sizes. The provision of two seats enables use of a smaller receiver vessel (and consequent reduced loss of liquid on vessel walls) for smaller samples.

In accordance with another feature of the invention, the sample tube, having a generally cylindrical inner wall defining a chamber for receiving a fluid sample, may be provided with a porous retainer disc disposed in the chamber intermediate the inlet and outlet ends of the tube to divide the chamber into rearward and forward compartments, and a packing filling the forward compartment. A wide variety of materials may be used for the packing, to extract substances from the sample ahead of the filter so as to permit recovery and analysis of the extracted substances and/or to free the filtered liquid of such substances, as may be desired to facilitate analysis of the liquid.

Additionally, the invention contemplates the provision of filter units (i.e. constituted of a sample tube, a filter support element ultrasonically welded thereto, and a filter disposed between them), having one or more of the foregoing features, for incorporation in a centrifugal filtering device.

Devices embodying the present invention are capable of use, to filter a wide variety of samples (and to perform other operations preparatory to analysis, e.g. through the provision of an appropriately selected packing in the sample tube), in centrifuges of wholly conventional character.

Further features and advantages of the invention will be apparent from the detailed description hereinbelow set forth, together with the accompanying drawings.

DETAILED DESCRIPTION

Figures 1, 2, 3, 4:
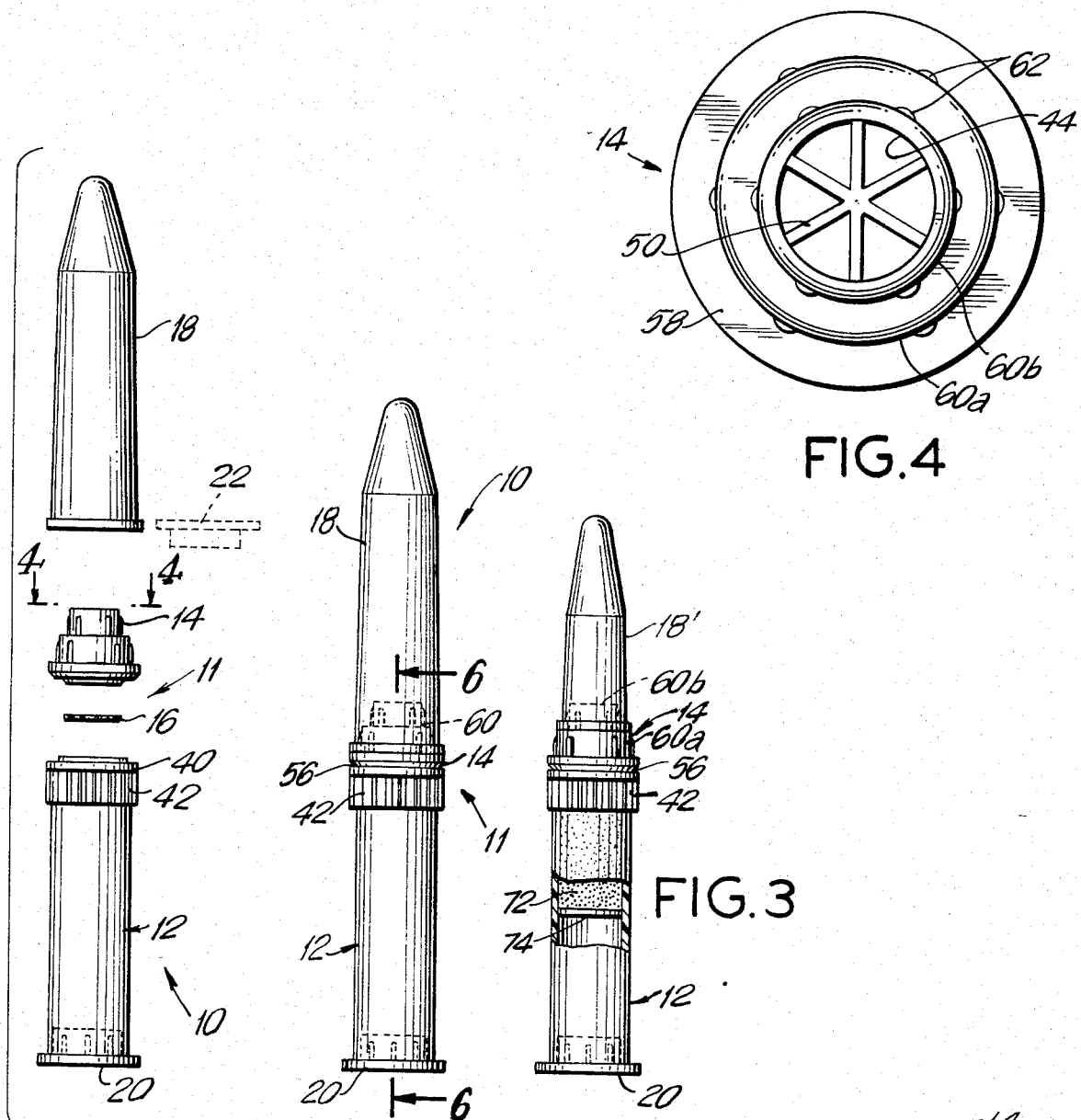
FIG. 1 is an exploded side elevational view of a centrifugal filtering device embodying the present invention in a particular form.
FIG. 2 is a view similar to FIG. 1, but showing the elements of the device in assembled relation.
FIG. 3 is a view similar to FIG. 3, but partly broken away, illustrating optional and alternative elements of the device.
FIG. 4 is an enlarged view, taken as along the line 4—4, of the forward end of the filter support element of the device of FIG. 1.

The embodiment of the invention illustrated in the drawings is a centrifugal filtering device 10 adapted for use, in a conventional centrifuge, to effect microfiltering of small (20 µl–5 ml) fluid samples, in preparation for chemical analysis of liquid and/or solid components of the samples. This device 10, as shown in FIGS. 1 and 2, includes a filter unit 11 comprising a sample tube 12, a filter support element 14 ultrasonically welded to the outlet (forward) end of the sample tube, and a filter 16 clamped between the sample tube and the support element. In addition, the device includes a receiver vessel 18 removably mounted on the outlet (forward) end of the support element 14, and a removable cap 20 closing the inlet (rearward) end of the sample tube; a cap 22 may also be provided for closing the mouth of the receiver vessel when the latter is removed from the filter element after centrifuging. The filter unit elements (sample tube, filter and support element) and the receiver vessel are aligned along a common rectilinear axis and, when fully assembled (with the cap 20) as shown in FIG. 2, cooperatively define a closed, elongated, axially rectilinear fluid container intersected by the filter 16 so that liquid can advance from the sample tube to the receiver vessel only by passing through the filter.

In the use of the device 10, a fluid sample to be filtered is introduced to the sample tube through the inlet end, which is then capped. The device containing the sample is spun in a centrifuge, with its axis oriented radially of the spin axis of the centrifuge and the receiver vessel (i.e. the forward end of the device) pointing away from the spin axis; the liquid component of the sample is thereby driven through the filter and into the receiver vessel, where it collects, while the solid component of the sample is retained on the filter. At the end of the spinning step, the vessel 18 containing the filtered liquid is separated from the filter unit for recovery and analysis of the liquid. If desired, the removed vessel 18 may be capped (for handling and/or storage) while it holds the filtered liquid.

Figure 6:
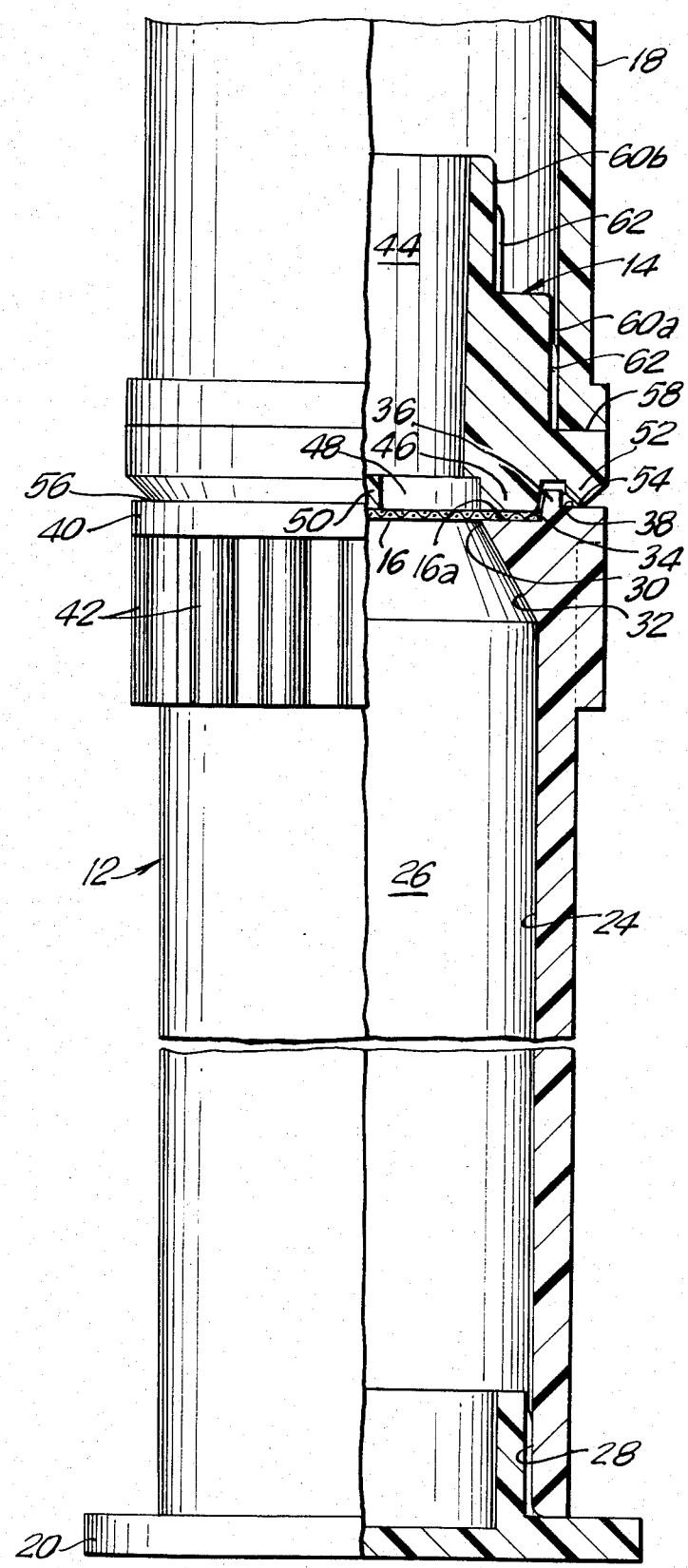
FIG. 6 is a further enlarged, fragmentary side elevational view of the device of FIG. 1, partly in section taken as along the line 6—6 of FIG. 2.
Figure 7:
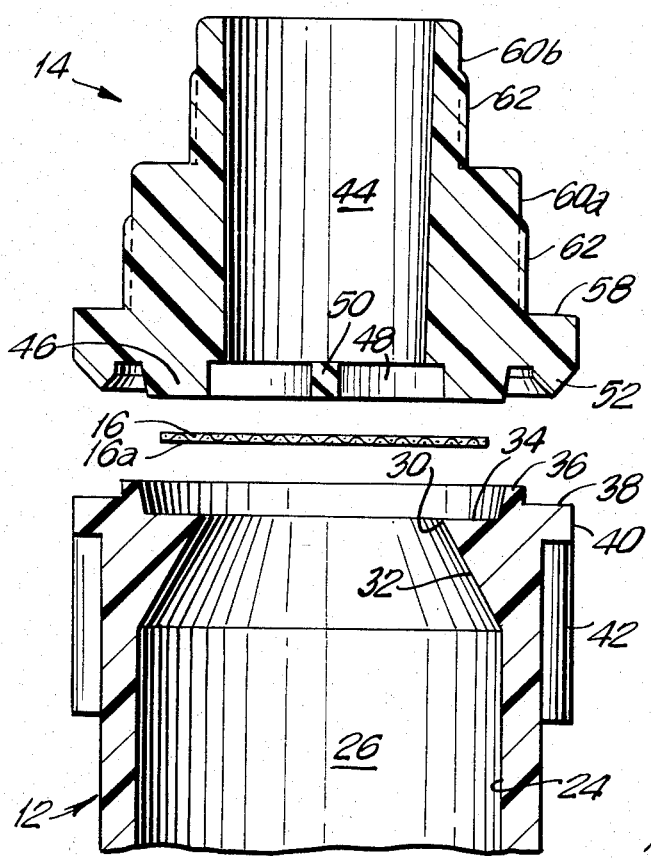
FIG. 7 is a similarly enlarged exploded sectional view of the filter support, filter, and a portion of the sample tube of the same device.

More particularly, and as best seen in FIGS. 6 and 7, in accordance with the invention in its illustrated embodiment, the sample tube 12 is an elongated, rigid, generally cylindrical body molded of polypropylene, with a generally cylindrical inner wall 24 defining a chamber 26 for receiving a fluid sample to be filtered. The chamber 26 extends from a circular inlet opening 28 at the rearward end of the sample tube (through which the sample is introduced to the tube) to a circular outlet opening 30 centered in the outlet or forward end of the tube, thus constituting an open-ended through passage. The inlet opening 28, however, is ordinarily closed by removable cap 20, while the outlet opening 30 is entirely occluded, in the assembled device, by the filter 16 (as hereinafter further explained), so that a fluid sample introduced to the chamber 26 is retained within the chamber until the device is centrifuged.

The circular outlet opening 30, though coaxial with the chamber and the inlet opening, is of somewhat smaller diameter than the inlet opening and the major extent of the chamber. As a specific feature of the invention, the forward portion 32 of the inner wall 24 tapers progressively inwardly to the periphery of the outlet opening 30. This arrangement of the inner wall and outlet opening minimizes "hold-up" of liquid in the sample tube during centrifuging (because the tapering wall guides centrifugally moving liquid directly to and through the outlet opening) and thereby contributes to desired high recovery of filtered liquid.

Further in accordance with the invention, the forward or outlet end of the sample tube 12 is formed with a first forwardly facing annular land 34 concentrically surrounding the circular outlet opening 30, an annular stop ridge 36 concentrically surrounding the land 34, and a second forwardly facing annular land 38 concentrically surrounding the stop ridge. As shown in FIGS. 6 and 7, the stop ridge 36 projects forwardly of the first and second lands, which are substantially flat surfaces. The inner wall of the stop ridge 36 slopes outwardly and forwardly to facilitate insertion of a mating portion of the filter support element 14, as hereinafter described. To provide adequate width for the second land 38, the forward end of the sample tube has an outwardly projecting annular flange 40, from which a plurality of strengthening ribs 42 extend rearwardly for a short distance on the outer surface of the tube 12. The ribs provide reinforcement for the region of the tube forward end which is directly subjected to welding forces during assembly of the filter unit, as explained below. As shown, the stop ridge 36, flange 40, and ribs 42 are molded integrally with the body of the tube 12.

The filter 16 is a flat, circular (disc-shaped) filter having a diameter larger than the diameter of the circular outlet opening 30 but smaller than the minimum inner diameter of the stop ridge 36. In the assembled filter unit, the filter 16 is disposed immediately forwardly of the opening 30, lying substantially in a plane perpendicular to the geometric axis of the tube 12 so as to completely occlude the opening 30. An annular peripheral portion 16a of the filter projects outwardly beyond the opening 30 on all sides, overlying and engaging the first annular land 34 of the sample tube. With the filter thus disposed, its periphery is completely laterally surrounded by the stop ridge 36; that is to say, the filter, extending across the opening 30 with its periphery engaging the first land 34, lies entirely within the circular area laterally bounded by the stop ridge 36. It will be understood that the term "filter," as used herein, refers to any thin sheetlike or weblike filter material, including filter paper, glass fiber filters, and materials conventionally designated membranes, or any combinations thereof.

The filter support element 14, like the tube 12, is a unitary body molded of polypropylene. It has a central cylindrical passage 44, so disposed as to be coaxial with the chamber 26 of tube 12 in the assembled filter unit, and opening through both the rearward end and the forward end of the support element.

At the rearward end of the support element, the passage 44 is concentrically surrounded by a rearwardly projecting annular lip portion 46 of the support element. This lip portion 46, which has a slightly bevelled outer wall (conforming in slope to the stop ridge inner wall), is dimensioned to be received with slight clearance within the annular stop ridge 36, as shown in FIG. 6. Further, the lip portion 46 has a rearwardly facing flat annular surface dimensioned and positioned for register with the first land 34 of the tube 12. In the assembled filter unit, this latter lip surface bears against the periphery of the filter 16 so that the filter periphery is compressed between the lip portion 46 and the land 34 to provide a liquid-tight mounting for the filter 16 without need for any gasket, O-ring, or other auxiliary sealing element.

The annular lip portion 46 defines the inlet end opening 48 of the support element passage 44. The opening 48 is coaxial with and slightly larger in diameter than the passage 44, but is not larger in diameter than the opening 30, with which it is also coaxial. Formed within the opening 48, i.e. extending across that opening from the inner wall of the lip portion 46, is a six-armed spider 50 for engaging the forwardly facing surface of the filter 16 to provide mechanical support for the filter against the force of fluid flow during centrifuging, with minimum obstruction of filter area.

As a still further feature of the invention, the filter support element 14 has, at its rearward end, an annular energy-directing ridge 52 of rearwardly tapering V-shaped profile surrounding the lip portion 46 in outwardly spaced relation thereto such that, when the lip portion is received within the stop ridge 36, the apex of this energy-directing ridge 52 bears against the second land 38 at a locality spaced outwardly of the stop ridge, as best seen in FIG. 6. The energy-directing ridge 52 is shaped to concentrate ultrasonic energy at its apex for localized fusion and welding of the ridge apex to the second land upon application of ultrasonic energy to the support element, i.e. during the ultrasonic welding operation described below.

The fusion of the apex of the energy-directing ridge 52 to the second land 38 provides an annular weld joint 54 securing the sample tube 12 to the support element 14 in sealed manner and holding the filter 16 clamped between the lip portion 46 of the support element and the first land 34 of the sample tube in a position completely occluding the outlet opening 30 of the sample tube chamber 26 and the inlet opening 48 of the support element passage 44. Since the locality of the annular weld joint 54 is spaced outwardly of the stop ridge 36, there is an air gap between them; this air gap, and the stop ridge itself, cooperatively prevent any fused material of the weld joint from reaching and adhering to the filter 16. Thus, when the support element and sample tube are separated by breaking the weld joint, the filter can be removed intact.

The outer surface of the energy-directing ridge 52 slopes forwardly to the outer side surface of the support element 14. Again as best seen in FIG. 6, when the support element and sample tube are assembled and welded, the latter surface of the ridge 52, and the outer portion of the second land 38, cooperatively define an incised annular score line 56 extending around the filter unit immediately outwardly of the weld joint 54. The weld joint is sufficiently mechanically weaker than the sample tube and the support element to enable the sample tube and the support element to be separated at the joint, by manual bending forces. This separation is facilitated by the provision of the annular score line 56. A currently preferred apical angle for the ridge 52, suitable to achieve a fully sealed weld joint yet to permit ready separation at the joint, is 90° (45° on each side of a line parallel to the sample tube axis).

Figure 5:
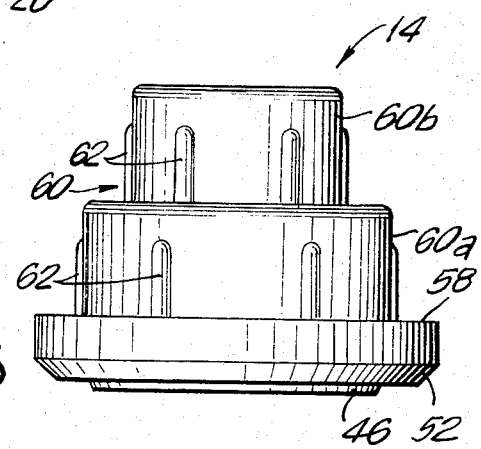
FIG. 5 is a similarly enlarged side elevational view of the filter support element.

Forwardly of the ridge 52, the outer wall of the support element 14 is offset inwardly to provide an annular, forwardly facing surface 58 to facilitate welding. The portion of the support element extending forwardly of this surface 58 is shaped to constitute a seat 60 (surrounding the forward portion of passage 44) for removably mounting the receiver vessel 18. Preferably, the seat is formed with two portions 60a and 60b (FIG. 5) of respectively different diameters disposed in succession along the axis of the passage 44, for respectively mounting receiver vessels of different sizes. Thus, immediately forwardly of the annular surface 58, the support element has a cylindrical outer surface portion of relatively large diameter constituting the seat portion 60a for the relatively large-sized receiver vessel 18 (FIG. 1), and forwardly of this seat portion 60a, the support element is stepped inwardly to provide the smaller-diameter seat portion 60b for mounting a smaller-sized receiver vessel 18' (FIG. 3). Each seat portion (60a or 60b) is so dimensioned that the mouth or inlet end portion of the associated receiver vessel (18 or 18') fits snugly and grippingly over it, and is provided with spaced longitudinal ribs 62 to assist the secure engagement of the receiver vessel and the seat portion. This provision for use of receiver vessels of different sizes further enhances recovery of filtered liquid of small samples, by enabling use of a small vessel (with a smaller internal surface area) for a smaller sample; since some liquid tends to be retained on the vessel surface, it is desirable to minimize vessel surface area in order to maximize liquid recovery.

As in the case of the sample tube, the various parts (lip portion, spider, energy-directing ridge, seat portions and ribs) of the filter support element are molded integrally.

Figure 8:
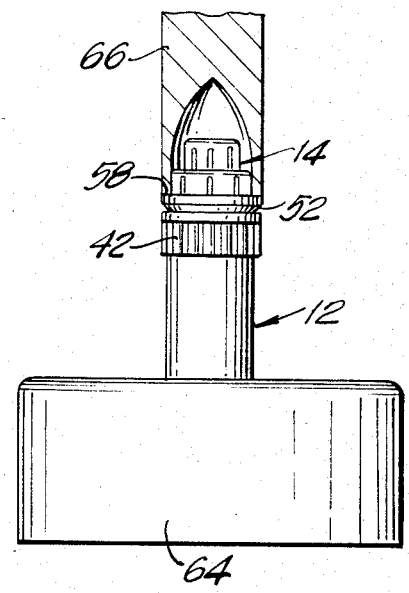
FIG. 8 is a schematic elevational view illustrating the joining of the filter support and sample tube of the device.

The structure and arrangement of the filter unit 11 may be further understood from a description of the way in which it is welded. Initially, the sample tube 12, filter 16, and support element 14 are assembled as indicated in FIG. 7, with their forward ends facing upwardly. The insertion of the support element lip portion 46 within the closely surrounding stop ridge 36 of the sample tube assures proper positioning of the energy-directing ridge 52, relative to the second land 38, for the welding operation. The assembled elements are placed upright in a support or nest 64 of a conventional ultrasonic welder having an axially vertical cylindrical horn 66 (FIG. 8) which is brought down into bearing engagement with the surface 58 (being dimensioned to engage the latter surface uniformly around its entire 360° extent), and exerts thereon a downward pressure for compressing the filter periphery 16a between lip portion 46 and land 34 and bringing the apex of ridge 52 into contact with land 38. Ultrasonic energy, applied through the horn, is concentrated by the energy-directing ridge 52 to fuse the ridge apex to the land 38, thereby forming the annular weld joint 54. During this operation, the stop ridge 36 assists in preventing excessive compression of the filter and also isolates the filter from the locality of the weld joint so that the filter is protected from contact with fused material of the joint and is thus left entirely free for intact removal upon subsequent separation of the sample tube and support element.

The parameters of the welding operation (e.g. down speed, weld time, hold time, pressure, etc.) are selected to achieve (1) compression of the filter portion 16a, around the entire filter periphery, sufficient to provide a fully liquid-tight sealed mounting of the filter, yet without breaking through the filter periphery at any point, and (2) a fully sealed weld around the full 360° of the annular weld joint which is nevertheless sufficiently weak to be breakable by manual bending forces. Selection of the parameters employed in any particular instance is dependent on such factors as the thickness, compressibility and fragility of the filter used, and characteristics of the specific welding equipment employed. As stated, the welding operation can conveniently be performed on entirely conventional ultrasonic welding apparatus (having an appropriately dimensioned horn), and suitable operating parameters can readily be determined through simple, straightforward trials by persons of ordinary skill in the ultrasonic welding art. Proper filter compression is established when the filter (after welding and subsequent separation of the sample tube and support element) exhibits a visible complete circular compression line or depression corresponding to the edge of opening 30, without cracks or ruptures of the filter periphery. A satisfactory weld joint is one which can be separated manually (by the procedure described below) and, when broken, shows (on the land 38) a continuous circular weld line.

Manual separation of the welded filter unit 11 is accomplished by grasping the filter support element 14 with a suitable gripping tool (not shown) having jaws cooperatively defining a cylindrical recess for distributing the gripping force substantially uniformly around the support element periphery, the gripping tool being held in one hand; grasping the sample tube 12 with the other hand; and exerting on the unit 11 manual forces (transverse to the geometric axis of the unit) tending to bend or break the unit at the incised score line 56. With a weld joint in accordance with the invention, the applied manual forces will cause the sample tube and support element to separate completely and relatively cleanly at the joint 52, enabling the filter (which, having been held only by compression between the now-separated parts, is free and nonadhered) to be lifted or dropped out intact for recovery and analysis of solids collected thereon. This separation of the unit also prevents re-use of the unit, as desired for avoidance of contamination of samples.

A wide variety of filter materials may be used to constitute the filter 16. Selection of a particular filter material, and of its characteristics such as pore size, is determined by the particular filtering operation to be performed. Illustrative examples of filter materials used in the present device are polytetrafluoroethylene (with a nominal pore size of 0.2, 0.45 or 1.0 micron), nylon (with a nominal pore size of 0.2 or 0.45 micron), cellulose acetate (with a nominal pore size of 0.2, 0.45 or 0.8 micron), and nitrocellulose (with a nominal pore size of 0.2 or 0.45 micron).

The receiver vessel 18 (FIGS. 1, 2 and 6) or 18' (FIG. 3) is a unitary, molded polypropylene member of elongated, forwardly tapering shape, defining a chamber for receiving and holding filtered liquid, and having an inlet end opening or mouth shaped to fit grippingly but removably over the seat portion 60a or 60b of the support element, i.e. to grip the seat strongly enough to remain in place during centrifuging but to be manually removable thereafter. The two sizes of receiver vessels usable with the same filter unit 11 may, for example, respectively have liquid capacities of 1.5 and 5.0 ml.

Conveniently, the entire device 10, including the welded filter unit 11, cap 20, and receiver vessel 18 or 18', may be assembled and supplied (together with a separate receiver vessel cap 22) in a sterile package by a manufacturer, with appropriate identifying indicia (such as color coding of the cap) representative of the nature and pore size of the contained filter. The user removes the cap 20, introduces a fluid sample to the sample tube 12 through the inlet end 28 thereof, recaps the sample tube, and places the device in a centrifuge. Typically, a number of the devices 10, each containing a sample to be filtered, are placed in the same centrifuge and spun together. In a standard laboratory centrifuge, having a 17 mm.×120 mm. shield, spinning at about 1,000 G for about ten minutes is effective to perform filtering. The vessel 18 or 18', now containing the filtered liquid component of the sample, is separated manually from the unit 11 and closed with separate, sterile cap 22 unless the contained liquid is to be subjected to immediate analysis. The unit 18 may be broken apart manually in the manner described above to recover the intact filter, for analysis of the solids collected thereon. It is found that the device of the invention affords advantageously high percent recovery of liquid with even very small (0.02-0.04 ml) samples, and with beneficial reduction in handling time, as compared to conventional filters.

Referring further to FIG. 3, the sample tube 12 is designed with a substantial capacity and with a substantially straight-sided internal configuration to enable provision of a packing 72 therein, as may be desired for special analytical purposes. For filtering operations employing a packing, a porous retainer disc 74 (e.g. fabricated of high-density polyethylene) is placed within the sample tube at an intermediate locality to divide the tube into forward and rearward compartments, the packing being disposed in the forward compartment. Conveniently, the packing is introduced to the sample tube through opening 28 after the filter unit is welded, and the retainer disc is then inserted to hold the packing in place, prior to introduction of the sample.

Examples of packings that may be used for performance of sophisticated sample preparation tasks are sieving gels, ion exchangers, and affinity agents. Thus, a packing of a fine pore sieving gel may be provided to desalt or effect a buffer exchange with a sample; or an immobilized affinity agent may be used to remove the albumin fraction from a serum sample; or an appropriate ion exchanger may be employed for the retention of proteins, which could then be successively stripped off from the packing by an eluent with a suitable pH gradient.

The effectiveness of such packings can be maximized through the use of centrifugation. Packings of these types, particularly the affinity and ion exchange media, usually require a certain "dwell" time in contact with the sample in order to be maximally effective in extracting and retaining the desired components from the sample. The length of this "dwell" time can be easily regulated by means of the variable speed control on the centrifuge, which determines the extent of the G-force effecting the speed of passage of the sample through the packing. The same factors apply in the use of eluents employed to extract and recover components selectively retained by the packing from the original sample. In addition, as such packings have considerably more bulk than a filter, they tend to retain more sample or eluent by capillary action and the use of higher speeds, resulting in a greater G-force, can be applied at the end of each sample extraction/packing elution process to thoroughly purge and clear the packing of any residual sample and/or eluent.

It is to be understood that the invention is not limited to the features and embodiments hereinabove specifically set forth but may be carried out in other ways without departure from its spirit.

We claim:

1. A centrifugal filtering device, comprising:
    (a) a generally cylindrical sample tube having an open inlet end and an open outlet end;
    (b) a filter support element ultrasonically welded to the outlet end of the sample tube at an annuular joint and defining an open-ended passage coaxial with the sample tube, said support element having a forward end formed with an annular seat surrounding said passage;
    (c) a filter clamped between the outlet end of the sample tube and the support element for completely occluding said passage such that liquid can enter said passage from said sample tube only by passing through said filter;
    (d) a receiver vessel having an open inlet end removably mounted on said seat, and a closed outer end, for collecting and retaining liquid advancing forwardly through said passage from said filter; and
(e) a cap for closing the inlet end of said sample tube;
(f) said annular joint being sufficiently mechanically weaker than said sample tube and said filter support element to enable the sample tube and the support element to be separated by application of manual bending forces at said joint for recovering said filter.

2. A device as defined in claim 1, wherein the filter support element and the sample tube cooperatively define an annular incised score line laterally surrounding said joint.

3. A device as defined in claim 1, wherein the outlet end of the sample tube has a central circular opening for egress of fluid from the sample tube, a first forwardly-facing annular land surrounding said circular opening, an annular stop ridge surrounding said first land, and a second forwardly-facing annular land surrounding said stop ridge, said stop ridge projecting forwardly of said first and second lands; wherein said filter is circular with a diameter intermediate the diameter of said circular opening and the inner diameter of said stop ridge, and is disposed in occluding relation to said circular opening with its periphery engaging said first land and completely laterally surrounded by said stop ridge; and wherein the filter support element has a rearward end formed with a rearwardly projecting annular lip surrounding said passage and dimensioned to be received within said annular stop ridge for engaging the peripheral portion of said filter, disposed as aforesaid, to press said peripheral portion of said filter against said first land; said annular joint being formed between said filter support element and said second land in generally concentric, outwardly spaced relation to said stop ridge.

4. A device as defined in claim 3, wherein the filter support element has, at its rearward end, an annular energy-directing ridge of rearwardly tapering V-shaped profile surrounding said lip in outwardly spaced relation thereto such that, with the lip received within said annular stop ridge, the apex of said energy-directing ridge bears against said second land at a locality spaced outwardly of said stop ridge, said energy-directing ridge being shaped to concentrate ultrasonic energy at its apex for localized fusion and welding of its apex to said second land upon application of ultrasonic energ to said support element.

5. A device as defined in claim 1, wherein said sample tube and said support element are made of polypropylene.

6. A device as defined in claim 1, wherein said sample tube has a generally cylindrical inner wall defining a chamber for receiving a fluid sample, and a circular outlet opening for said chamber at the outlet end of said tube, and wherein the forward portion of said inner wall tapers inwardly to the periphery of said outlet opening.

7. A device as defined in claim 6, wherein said seat is formed with two portions of respectively different diameters, disposed in succession along the axis of said passage, for respectively mounting receiver vessels of different sizes.

8. A device as defined in claim 1, wherein said seat is formed with two portions of respectively different diameters, disposed in succession along the axis of said passage, for respectively mounting receiver vessels of different sizes.

9. A device as defined in claim 1, wherein said sample tube has a generally cylindrical inner wall defining a chamber for receiving a fluid sample, and further including a porous retainer disc disposed in said chamber intermediate the inlet and outlet ends of the tube to divide said chamber into rearward and forward compartments, and a packing filling said forward compartment.

10. A centrifugal filtering device, comprising:
(a) a generally cylindrical sample tube having an open inlet end and an open outlet end with a central circular opening for egress of fluid from the sample tube and a forwardly-facing annular surface surrounding said central opening;
(b) a filter support element ultrasonically welded to the outlet end of the sample tube at an annular joint and defining an open-ended passage coaxial with the sample tube, said support element having a forward end formed with an annular seat surrounding said passage and a rearward end with a rearwardly-facing annular surface surrounding said passage and dimensioned and positioned for register with said forwardly-facing annular surface of the sample tube;
(c) a circular filter having a periphery engaged by and compressed between said forwardly-facing annular surface of said sample tube and said rearwardly-facing annular surface of said support element for completely occluding said passage such that liquid can enter said passage from said sample tube only by passing through said filter;
(d) a receiver vessel having an open inlet end removably mounted on said seat, and a closed outer end, for collecting and retaining liquid advancing forwardly through said passage from said filter; and
(e) a cap for closing the inlet end of said sample tube;
(f) said annular joint essentially concentrically surrounding said filter periphery in outwardly spaced relation thereto.

11. A centrifugal filtering device, comprising:
(a) a generally cylindrical sample tube made of polypropylene and having an open inlet end and an open outlet end;
(b) a filter support element made of polypropylene ultrasonically welded to the outlet end of the sample tube at an annular joint and defining an open-ended passage coaxial with the sample tube, said support element having a forward end formed with an annular seat surrounding said passage;
(c) a filter clamped between the outlet end of the sample tube and the support element for completely occluding said passage such that liquid can enter said passage from said sample tube only by passing through said filter;
(d) a receiver vessel made of polypropylene, having an open inlet end removably mounted on said seat, and a closed outer end, for collecting and retaining liquid advancing forwardly through said passage from said filter; and
(e) a cap for closing the inlet end of said sample tube.

12. A device as defined in claim 11, wherein the outlet end of the sample tube has a central circular opening for egress of fluid from the sample tube, a first forwardly-facing annular land surrounding said circular opening, an annular stop ridge surrounding said first land, and a second forwardly-facing annular land surrounding said stop ridge, said stop ridge projecting forwardly of said first and second lands; wherein said filter is circular with a diameter intermediate the diameter of said circular opening and the inner diameter of said stop ridge, and is disposed in occluding relation to said circular opening with its periphery engaging said first land and completely laterally surrounded by said stop ridge; wherein the filter support element has a rearward end formed with a rearwardly projecting annular lip surrounding said passage and dimensioned to be received within said annular stop ridge for engaging the peripheral portion of said filter, disposed as aforesaid, to press said peripheral portion of said filter against said first land; said annular joint being formed between said filter support element and said second land in generally concentric, outwardly spaced relation to said stop ridge; and wherein the filter support element has, at its rearward end, an annular energy-directing ridge of rearwardly tapering V-shaped profile surrounding said lip in outwardly spaced relation thereto such that, with the lip received within said annular stop ridge, the apex of said energy-directing ridge bears against said second land at a locality spaced outwardly of said stop ridge, said energy-directing ridge being shaped to concentrate ultrasonic energy at its apex for localized fusion and welding of its apex to said second land upon application of ultrasonic energy to said support element.

13. A centrifugal filtering device comprising:
 (a) a generally cylindrical sample tube having an open inlet end and an open outlet end;
 (b) a filter support element ultrasonically welded to the outlet end of the sample tube at an annular joint and defining an open-ended passage coaxial with the sample tube, said support element having a forward end formed with an annular seat surrounding said passage;
 (c) a filter clamped between the outlet end of the sample tube and the support element for completely occluding said passage such that liquid can enter said passage from said sample tube only by passing through said filter;
 (d) a receiver vessel having an open inlet end removably mounted on said seat, and a closed outer end, for collecting and retaining liquid advancing forwardly through said passage from said filter; and
 (e) a cap for closing the inlet end of said sample tube;
 (f) said sample tube having a generally cylindrical inner wall defining a chamber for receiving a fluid sample, and a circular outlet opening for said chamber at the outlet end of said tube, the forward portion of said inner wall tapering inwardly to the periphery of said outlet opening.

14. A device as defined in claim 13, wherein said seat is formed with two portions of respectively different diameters, disposed in succession along the axis of said passage, for respectively mounting receiver vessels of different sizes.

15. A centrifugal filtering device, comprising:
 (a) a generally cylindrical sample tube having an open inlet end and an open outlet end;
 (b) a filter support element ultrasonically welded to the outlet end of the sample tube at an annular joint and defining an open-ended passage coaxial with the sample tube, said support element having a forward end formed with an annular seat surrounding said passage;
 (c) a filter clamped between the outlet end of the sample tube and the support element for completely occluding said passage such that liquid can enter said passage from said sample tube only by passing through said filter;
 (d) a receiver vessel having an open inlet end removably mounted on said seat, and a closed outer end, for collecting and retaining liquid advancing forwardly through said passage from said filter; and
 (e) a cap for closing the inlet end of said sample tube;
 (f) said sample tube having a generally cylindrical inner wall defining a chamber for receiving a fluid sample, and further including a porous retainer disc disposed in said chamber intermediate the inlet and outlet ends of the tube to divide said chamber into rearward and forward compartments, and a packing filling said forward compartment.

16. In a centrifugal filtering device, a filter unit comprising:
 (a) a generally cylindrical sample tube having an open inlet end and an open outlet end;
 (b) a filter support element ultrasonically welded to the outlet end of the sample tube at an annular joint and defining an open-ended passage coaxial with the sample tube, said support element having a forward end formed with an annular seat surrounding said passage for removably mounting a receiver vessel for collecting and retaining liquid advancing forwardly through said passage; and
 (c) a filter clamped between the outlet end of the sample tube and the support element for completely occluding said passage such that liquid can enter said passage from said sample tube only by passing through said filter;
 (d) said annular joint being sufficiently mechanically weaker than said sample tube and said filter support element to enable the sample tube and the support element to be separated by application of manual bending forces at said joint for recovering said filter.

17. A unit as defined in claim 16, wherein the filter support element and the sample tube cooperatively define an annular incised score line laterally surrounding said joint.

18. A unit as defined in claim 16, wherein the outlet end of the sample tube has a central circular opening for egress of fluid from the sample tube, a first forwardly-facing annular land surrounding said circular opening, an annular stop ridge surrounding said first land, and a second forwardly-facing annular land surrounding said stop ridge, said stop ridge projecting forwardly of said first and second lands; wherein said filter is circular with a diameter intermediate the diameter of said circular opening and the inner diameter of said stop ridge, and is disposed in occluding relation to said circular opening with its periphery engaging said first land and completely laterally surrounded by said stop ridge; and wherein the filter support element has a rearward end formed with a rearwardly projecting annular lip surrounding said passage and dimensioned to be received within said annular stop ridge for engaging the peripheral portion of said filter disposed as aforesaid, to press said peripheral portion of said filter against said first land; said annular joint being formed between said filter support element and said second land in generally concentric, outwardly spaced relation to said stop ridge.

19. A unit as defined in claim 18, wherein the filter support element has, at its rearward end, an annular energy-directing ridge of rearwardly tapering V-shaped profile surrounding said lip in outwardly spaced relation thereto such that, with the lip received within said annular stop ridge, the apex of said energy-directing ridge bears against said second land at a locality spaced outwardly of said stop ridge, said energy-directing ridge being shaped to concentrate ultrasonic energy at its apex for localized fusion and welding of its apex to said second land upon application of ultrasonic energy to said support element.

20. In a centrifugal filtering device, a filter unit comprising:
(a) a generally cylindrical sample tube having an open inlet end and an open outlet end with a central circular opening for egress of fluid from the sample tube and a forwardly-facing annular surface surrounding said central opening;
(b) a filter support element ultrasonically welded to the outlet end of the sample tube at an annular joint and defining an open-ended passage coaxial with the sample tube, said support element having a forward end formed with an annular seat surrounding said passage for removably mounting a receiver vessel for collecting and retaining liquid advancing forwardly through said passage, said support element further having a rearward end with a rearwardly-facing annular surface surrounding said passage and dimensioned and positioned for register with said forwardly-facing annular surface of the sample tube; and
(c) a circular filter having a periphery engaged by and compressed between said forwardly-facing annular surface of said sample tube and said rearwardly-facing annular surface of said support element for completely occluding said passage such that liquid can enter said passage from said sample tube only by passing through said filter;
(d) said annular joint essentially concentrically surrounding said filter periphery in outwardly spaced relation thereto.

21. In a centrifugal filtering device, a filter unit comprising:
(a) a generally cylindrical sample tube made of polypropylene and having an open inlet end and an open outlet end;
(b) a filter support element made of polypropylene ultrasonically welded to the outlet end of the sample tube at an annular joint and defining an open-ended passage coaxial with the sample tube, said support element having a forward end formed with an annular seat surrounding said passage for removably mounting a receiver vessel for collecting and retaining liquid advancing forwardly through said passage; and
(c) a filter clamped between the outlet end of the sample tube and the support element for completely occluding said passage such that liquid can enter said passage from said sample tube only by passing through said filter.

22. In a centrifugal filtering device, a filter unit comprising:
(a) a generally cylindrical sample tube having an open inlet end and an open outlet end;
(b) a filter support element ultrasonically welded to the outlet end of the sample tube at an annular joint and defining an open-ended passage coaxial with the sample tube, said support element having a forward end formed with an annular seat surrounding said passage for removably mounting a receiver vessel for collecting and retaining liquid advancing forwardly through said passage; and
(c) a filter clamped between the outlet end of the sample tube and the support element for completely occluding said passage such that liquid can enter said passage from said sample tube only by passing through said filter;
(d) said sample tube having a generally cylindrical inner wall defining a chamber for receiving a fluid sample, and a circular outlet opening for said chamber at the outlet end of said tube, the forward portion of said inner wall tapering inwardly to the periphery of said outlet opening.

23. A unit as defined in claim 22, wherein said seat is formed with two portions of respectively different diameters, disposed in succession along the axis of said passage, for respectively mounting receiver vessels of different sizes.

24. In a centrifugal filtering device, a filter unit comprising:
(a) a generally cylindrical sample tube having an open inlet end and an open outlet end;
(b) a filter support element ultrasonically welded to the outlet end of the sample tube at an annular joint and defining an open-ended passage coaxial with the sample tube, said support element having a forward end formed with an annular seat surrounding said passage for removably mounting a receiver vessel for collecting and retaining liquid advancing forwardly through said passage; and
(c) a filter clamped between the outlet end of the sample tube and the support element for completely occluding said passage such that liquid can enter said passage from said sample tube only by passing through said filter;
(d) said seat being formed with two portions of respectively different diameters, disposed in succession along the axis of said passage, for respectively mounting receiver vessels of different sizes.

* * * * *